Patented Nov. 17, 1953

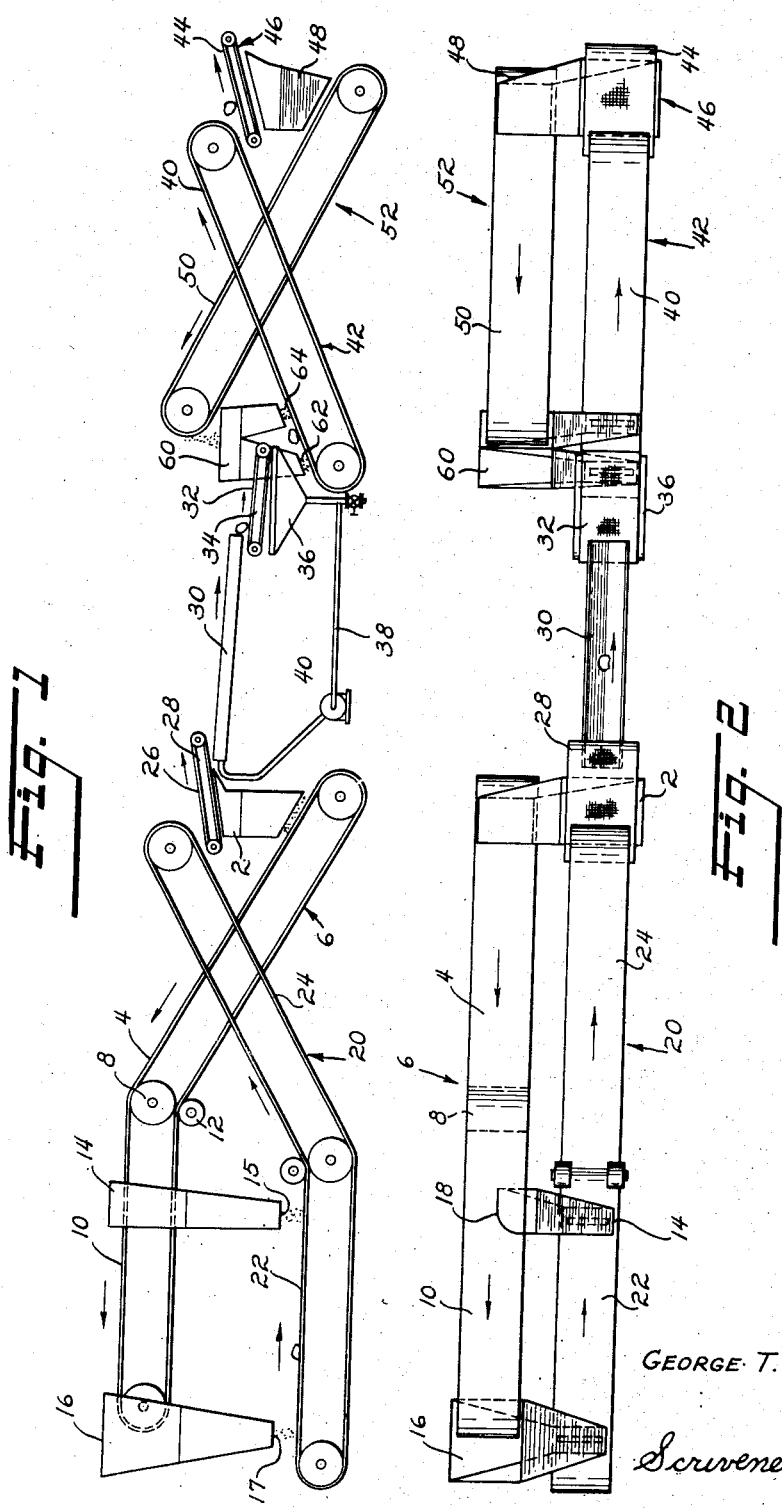

2,659,339

UNITED STATES PATENT OFFICE 2,659,339

BREADING MACHINE FOR RAW OYSTERS

George T. Harrison, Tilghman, Md., assignor to Tilghman Packing Company, Tilghman, Md., a corporation of Maryland Application March 28, 1952, Serial No. 279,010

4 Claims. (Cl. 118—16)

This invention relates broadly to the preparation of food products and, more particularly, to the covering of such products with an edible coating. While the invention is not to be considered as limited to the covering of any particular food or other product, or to any particular coating material, it is of particular utility in the coating of raw, shucked oysters and in this application it will be so described.

The invention described and claimed in this application constitutes an improvement over that described and claimed in my co-pending application Serial No. 253,775, filed October 30, 1951, for Breading Machine, and it has been the principal object of my invention, which is achieved in the manner and by the means described herein, to provide new and improved apparatus for applying an edible adherent coating to a food product such as a raw, shucked oyster.

Other objects and features of novelty of my invention will be made apparent by the following description and the appended claims, reference being made to drawings in which:

Fig. 1 is a generally schematic side view of an oyster breading machine according to my invention, and Fig. 2 is a top plan view of such a machine.

A breading machine constructed and operative in accordance with my invention is disclosed in the drawings forming part of this application and comprises a hopper 2, the open lower end of which is positioned above the lowermost end of the upper reach 4 of an upwardly-inclined endless conveyor belt 6. Finely ground breading or similar material is contained in the hopper 2 and is fed from the lower end thereof to the upper reach 4 of the conveyor belt, by which it is moved upwardly.

At its upper end the reach 4 of conveyor 6 passes over a pulley 8 and continues in a generally horizontal plane as shown at 10, the lower reach of the conveyor 6 being preferably held against the pulley 8 by an idler roller 12. Breading or other material on reach 4 of the conveyor is adapted to be delivered, preferably in equal amounts, to two hoppers 14, 16 which are positioned, respectively, at or adjacent the pulley 8 at the beginning of the horizontal part of the reach, and at the delivery end of the reach. Breading material is diverted from upper reach 4 of belt 6 into hopper 14 by means of a baffle or arm 18 which extends from the upper end of the hopper approximately half way across the belt and in scraping engagement therewith. Breading is delivered to hopper 16 by falling directly into the hopper from the end of the upper reach of the conveyor.

A second conveyor belt 20 is disposed in side-by-side relation to the belt 6 and moves in the opposite direction. The inlet end of the upper reach 22 of belt 20 is disposed at a lower level than the delivery end of belt 6 and is guided in a generally horizontal plane. The hoppers 14, 16 are laterally inclined so that their open bottoms 15, 17 overlie parts of the horizontal part of upper reach 22 which are spaced in the direction of travel of the belt. The delivery end of belt 20 is upwardly inclined, as shown at 24, and terminates above the inlet end of the upper reach 26 of an endless wire mesh belt 28, below the lower reach of which is the open upper end of the breading hopper 2.

The delivery end of the upper reach 26 of belt 28 overlies the entrance end of a downwardly inclined trough 30, the delivery end of which overlies the inlet end of the upper reach 32 of an endless wire mesh belt 34, the lower reach of which overlies the open upper end of a vat 36 which contains batter. The lower part of the vat is connected to the inlet end of trough 30 through piping 38 and pump 40, whereby the trough is constantly supplied with liquid batter which flows along it, and falls from it through the wire mesh belt 34 into the vat 36.

The delivery end of the upper reach 32 of the wire mesh belt overlies the inlet end of the upper reach 40 of an upwardly-inclined endless conveyor belt 42. The delivery end of the upper reach 40 of belt 42 overlies the inlet end of the upper reach 44 of an endless wire mesh belt 46, the lower reach of which is disposed above the open upper end of a hopper 48, the open lower end of which lies above the inlet end of the upper reach 50 of an endless conveyor belt 52 which is disposed in side-by-side relation to conveyor belt 42, is inclined oppositely with respect thereto and travels in the opposite direction. The delivery end of the upper reach 50 of belt 52 overlies the open upper end of a hopper 60 which is disposed above and adjacent the inlet end of the upper reach 40 of endless belt 42 and which has, at its lower part, two discharge openings 62, 64 which are spaced longitudinally of the upper reach 40.

In the use and operation of the described machine it will be assumed that raw oysters are to be breaded. Each raw, untreated oyster is placed on the upper reach 22 of the conveyor 20 between the discharge ports 17, 15 of the hoppers 16, 14. The breading material passing out of the leading discharge port 17 will fall on the reach 22 and coat the same so that when the oyster is placed on the reach at the described point it will immediately receive on its lower surface a coating of breading material. The material falling from the trailing port 15 will fall onto the upper and side surfaces of the oyster as the oyster passes under port 15 as the belt moves, thus completely covering the oyster with a coating of breading material. When the coated oyster reaches the discharge end of reach 22 of conveyor 20 it will fall therefrom onto the upper reach of wire mesh belt 28 and will be delivered from the delivery end of this belt to the inlet end of the trough 30. At the same time, excess breading material falling from the upper reach 22 onto the belt 28 will pass through the belt into the hopper 2 from which it will be re-delivered to the upper reach 4 of conveyor 6. The breaded oyster will be moved along the trough 30 by the moving stream of batter in the trough and in so doing will be completely coated with batter. The oyster thus coated will fall from the delivery end of the trough onto the upper reach 32 of conveyor 34 while excess batter flowing from the delivery end of the trough will pass through the wire mesh belt 34 and fall into the vat 36. The oyster, which is now covered with batter, will fall from the delivery end of belt 34 onto the inlet end of the upper reach 40 or belt 42 at a point between the discharge openings 62, 64 of breading hopper 60, thus insuring that the batter-covered surface of the oyster will receive a complete coating of breading. The oyster will be moved to the discharge end of reach 40 of belt 42 from which it will fall onto the upper reach of wire mesh belt 46 and will pass from the delivery end thereof to a storage, packing or other means. Excess breading material falling from the upper reach 40 of conveyor 42 onto the wire mesh belt 46 will pass through the belt into the hopper 48 from which it will be delivered by the upper reach 50 of conveyor 52 to the hopper 60 from which it will be redelivered to the upper reach 40 of conveyor 42.

It will be apparent that by the means provided by this invention an oyster or other food product will be given a first coating of an adherent material such as breading, then a coating of adherent batter, and then a second coating of breading material and that, by reason of the construction and arrangement of the parts, all surfaces of the oyster or other food product will be completely covered.

While I have described a machine for applying three coatings to the food product it will be apparent that within the scope of the invention additional coatings may be applied to the food product by utilization of means which are the same as or similar to those disclosed. It will also be apparent that within the scope of this invention products other than food products may be treated by the means disclosed. The disclosed means and apparatus are not to be considered, therefore, as limiting the invention in any way and a definition of the scope of the invention must be had by reference to the appended claims.

What is claimed is:

1. Apparatus for providing an edible coating to an edible food product such as any oyster which has such a texture that dry particles will adhere thereto, comprising a first endless conveyor belt on the upper reach of which un-coated edible products are adapted to be placed at a predetermined point, means for supplying dry, edible granular material to said upper reach at points behind and ahead of said predetermined point whereby the entire outer surface of the product is covered as the conveyor belt moves, a first endless wire mesh conveyor belt at the delivery end of said conveyor belt to receive and separate the coated products and the excess granular material not adhering thereto, an inclined trough having its inlet end disposed below the delivery end of said wire mesh conveyor belt, means for introducing batter into the inlet end of said trough to produce a flowing stream of batter therein which carries the breaded product along the trough and coats it with batter, a second endless wire mesh conveyor belt having its inlet end positioned below the delivery end of the trough to receive coated products therefrom, a vat positioned below said second wire mesh belt to receive excess batter from the delivery end of the trough, a second endless conveyor belt having the inlet end of the upper reach thereof positioned below the delivery end of said second wire mesh belt to receive coated edible products therefrom at a pre-determined point, a first hopper positioned above the inlet end of said second conveyor belt and having two discharge ports spaced longitudinally of said belt at points behind and ahead of said pre-determined point thereon, a third endless wire mesh belt having its inlet end positioned below the delivery end of said second conveyor belt to receive coated edible products therefrom, a second hopper positioned below said third wire mesh belt to receive excess breading material passing therethrough and having an open discharge port, a third endless conveyor belt having its inlet end positioned below the third hopper to receive material therefrom and the delivery end of which is positioned above the open upper end of said first hopper.

2. Apparatus according to claim 1 comprising, in addition, means for supplying batter from the vat to the inlet end of the trough.

3. Apparatus according to claim 1 in which the means for supplying granular material to the upper reach of the first conveyor belt comprises a third hopper having its open upper end positioned below the first wire mesh belt, a fourth endless conveyor belt the inlet end of the upper reach of which is positioned below said hopper to receive material therefrom, a hopper having its open upper end positioned at the delivery end of said fourth conveyor belt to receive material therefrom and having a discharge port positioned above the first conveyor belt ahead of the pre-determined point thereof at which uncoated edible products are placed thereon, a fourth hopper having its open upper end positioned adjacent the fourth conveyor belt at a point ahead of the delivery end of the conveyor belt and having a discharge port positioned above the first conveyor belt in the direction of travel thereof from the pre-determined point thereof at which uncoated edible products are placed thereon, and means for moving from the fourth conveyor belt to said fourth hopper a part only of the material on said fourth conveyor belt.

4. Apparatus according to claim 3, in which the means for moving material from the fourth conveyor belt to the fourth hopper comprises a baffle extending from the open upper end of the hopper partially across the upper reach of the conveyor belt and in scraping engagement therewith.

GEORGE T. HARRISON.

References Cited in the file of this patent

UNITED STATES PATENTS

| Number | Name | Date |
|---|---|---|
| 1,743,227 | Melville | Jan. 14, 1930 |
| 2,300,396 | Bookidis | Nov. 3, 1942 |
| 2,347,164 | Petrilli | Apr. 18, 1944 |
| 2,590,051 | Spain | Mar. 18, 1952 |
| 2,599,937 | Petrilli | June 10, 1952 |